United States Patent [19]

Boden

[11] 3,965,544

[45] June 29, 1976

[54] LOCKING DEVICE WITH COMBINED WEDGING AND SPRING ACTION

[76] Inventor: Ogden W. Boden, 1580 Gaywood Drive, Altadena, Calif. 91001

[22] Filed: June 11, 1975

[21] Appl. No.: 585,792

[52] U.S. Cl. .......................... 24/136 R; 24/115 M; 403/211; 403/374; 36/50
[51] Int. Cl.² ......................................... F16G 11/00
[58] Field of Search ............ 24/115 R, 30.5 S, 49 S, 24/136 B, 115 M, 136 R, 117; 403/211, 374; 36/50

[56] References Cited
UNITED STATES PATENTS

| | | | |
|---|---|---|---|
| 3,132,390 | 5/1964 | Boden | 24/30.5 |
| 3,861,003 | 1/1975 | Boden | 24/117 R |
| 3,897,161 | 7/1975 | Reinwall, Jr. | 24/115 R |

Primary Examiner—Paul R. Gilliam
Assistant Examiner—Doris L. Troutman
Attorney, Agent, or Firm—William P. Green

[57] ABSTRACT

A device for locking cords or the like against longitudinal movement, and including a slide received within a tapering passage in a body and movable axially relative to the body, with a cord extending along a path between a locking portion of the slide and a side wall of the tapering body passage, and with the cord being gripped by a wedging action when the cord is pulled longitudinally, and also by a spring action attained by yieldingly urging the locking portion laterally toward the side wall of the body independently of the camming action. Preferably, the slide has two such locking portions formed as two arms yieldingly urged laterally away from one another and defining two paths along which a pair of cords or the like extend at opposite sides of the slide, with each cord being gripped by both a wedging action and spring action.

20 Claims, 7 Drawing Figures

LOCKING DEVICE WITH COMBINED WEDGING AND SPRING ACTION

BACKGROUND OF THE INVENTION

This invention relates to improved devices for locking cords or other elongated flexible elements against longitudinal movement relative to the device, as for instance in locking a draw string of a garment, laundry bag, or the like.

The locking devices of the present invention are of a general type including a body containing a passage through which a cord or cords extend, and a slide contained within the body and free for limited movement relative to the body along essentially predetermined axis. The passage in the body is tapered in a manner serving to grip the cords between the slide and body walls and lock the cords by wedging action against longitudinal movement in a predetermined direction. Some of the various prior art devices of this general type have been shown in my earlier U.S. Pats. Nos. 3,132,390, 3,861,003 and 3,845,575.

One feature of such devices to which some persons have objected resides in the fact that in prior arrangements of this type the cords have not actually been tightly gripped and clamped against longitudinal movement until a pulling force is exerted on the cords, at which time that force itself may serve to pull the slide axially a short distance within and relative to the body of the device in a relation creating the locking action by the discussed wedging effect. In some instances, it may be necessary to initiate such setting of the locking slide by manually moving the slide axially against the cords and toward the restricted end of the body passage in order to position the slide for properly locking the cords when they are pulled.

SUMMARY OF THE INVENTION

A major purpose of the present invention is to provide a device of the above discussed general type for locking a pair of cords or other elongated elements, or only a single such element if preferred, against longitudinal movement, and which will have both the high load taking characteristics of a wedging action, and in addition an instant locking effect which assures immediate and automatic retention of the cords against longitudinal movement as soon as they are pulled and without the necessity for pushing the slide to a set position. These results are attained by utilizing a unique combination of wedging and spring actions, in which a spring action assures an instantaneous and positive locking effect whenever the cord is pulled with any force in a predetermined direction, while an interrelated wedging action enhances the locking effect to take extremely high load forces if necessary.

Structurally, the slide of a device embodying the invention has a locking portion located opposite a side wall of a tapering passage through the body of the device, and is yieldingly urged laterally toward that side wall, to clamp a cord or other elongated flexible element thereagainst, so that the cord is immediately retained against longitudinal movement when pulled in the locking direction, and this locking action is enhanced greatly upon very slight axial movement of the slide by the wedging action resultant from the tapering configuration of the body passage. Preferably, the slide has two such locking portions positioned opposite and facing two converging opposite side walls of the passage body, and desirably taking the form of two arms which are yieldingly urged in opposite directions relative to one another and toward those two walls respectively, to clamp two cords between the arms and walls. The two arms may be joined together at corresponding ends thereof in a relation yieldingly urging them relatively apart. More particularly, best results are attained when the slide is formed of a single piece of resinous plastic material or other material having two arms joined together at their ends, with the material having sufficient resilience to normally urge the arms apart and to clamping positions.

The arms should have teeth at their outer sides for engaging and gripping the cords, and may have handle portions projecting outwardly from the body to positions at which they are accessible for manual squeezing of the two arms relatively toward one another and to cord releasing positions. The axial movement of the slide may be limited by reception of projections on the arms within an elongated slot formed in the body of the device. These projections may have camming surfaces enabling them to spread the body slightly apart as the slide is initially moved into position, to enable the projections to be forced into the slot on assembly of the device.

BRIEF DESCRIPTION OF THE DRAWINGS

The above and other features and objects of the invention will be better understood from the following detailed description of the typical embodiment illustrated in the accompanying drawings in which.

DESCRIPTION OF THE PREFERRED EMBODIMENT

Figure 1:
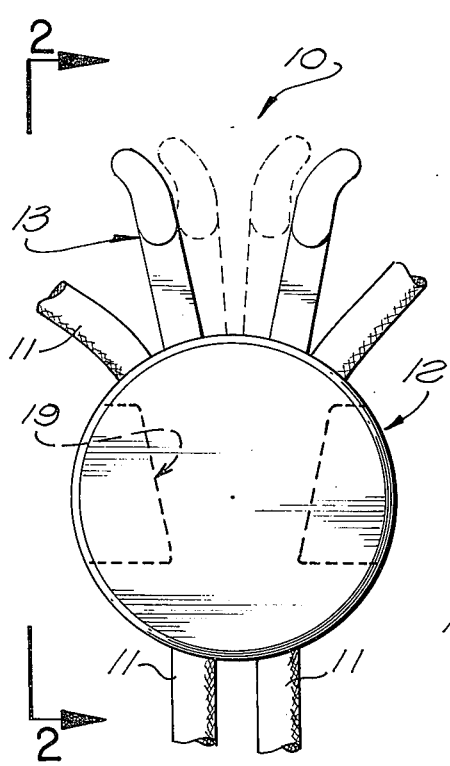
FIG. 1 is a front view of a cord locking device constructed in accordance with the invention.

Referring first to FIG. 1, I have represented at 10 a cord locking device constructed in accordance with the invention, as it appears when utilized for releasably locking two cords 11 against longitudinal movement relative to the device. The locking device 10 includes a body 12 containing a passage through which the cords 11 extend, and also containing a locking slide 13 movably received between the cords. The cords themselves may be formed of any appropriate flexible material, typically being woven or otherwise shaped to have a normal essentially circular cross-section, though it is contemplated that certain features of the invention may be applied to the locking of elongated elements of other shapes, such as flat belts and the like.

Figure 2:
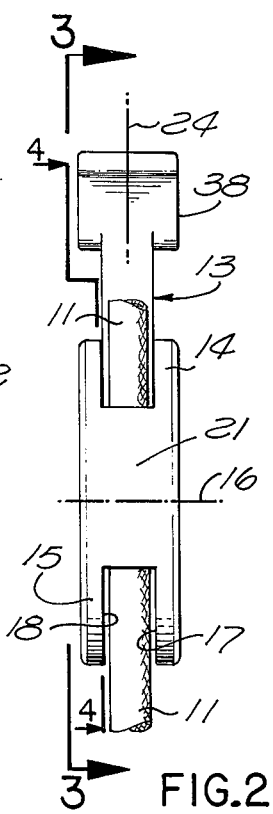
FIG. 2 is an enlarged side view of the FIG. 1 device, taken on line 2—2 of FIg. 1.
Figure 4:
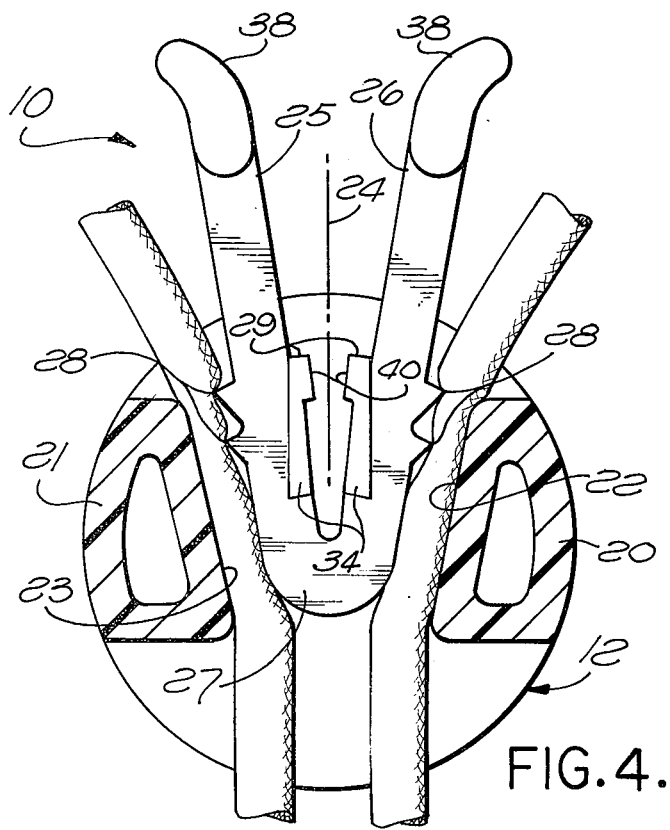
FIG. 4 is an enlarged section on line 4—4 of FIG. 2.

Body 12 and slide 13 may be formed of any suitable elastic material, such as an appropriate resinous plastic material or metal, adapted to be deformed slightly from and yieldingly return to predetermined normal conditions in the manner discussed hereinbelow. For example, the body and slide may typically be molded of polypropylene and acetal resin respectively. The materials are selected and dimensioned to render the body substantially rigid except for a capacity for slight resilient deformability during initial insertion of the slide thereinto, as will be discussed at a later point, and to give the slide a capacity for resilient deformability and a spring action as will be discussed. The body may be considered as including two essentially flat circular front and rear walls 14 and 15, centered about and disposed transversely of an axis 16 (FIG. 2). The opposed inner surfaces 17 and 18 of these walls are planar and perpendicular to axis 16, to define the front and rear walls of a passage 19 within which the slide and cords are received. These two walls 14 and 15 are joined together by two opposite side portions 20 and 21 of the body, molded integrally with walls 14 and 15, and having at their inner sides two planar surfaces 22 and 23 defining opposite side walls of passage 19 (FIG. 4). These surfaces 22 and 23 lie in planes which are perpendicular to surfaces 17 and 18, and are therefore parallel to axis 16. Surfaces 22 and 23 may be considered as converging symmetrically and at equal angles with respect to an axis 24, which is also the main axis of movement of slide 13.

The slide is shaped to have two laterally spaced similar arms, which are also symmetrical with respect to axis 24, and which are joined at their inner ends by a cross piece or return bend portion 27 preferably molded integrally with arms 25 and 26. At their outer sides, the arms 25 and 26 have teeth 28, which face laterally outwardly toward and are opposite the camming or wedging surfaces 22 and 23, to grip or clamp the two cords 11 between these arms and side wall surfaces 22 and 23 respectively.

Figure 3:
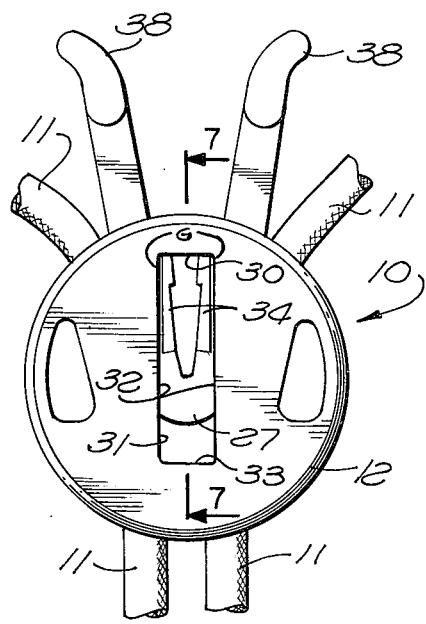
FIG. 3 is a rear view taken on line 3—3 of FIG. 2.
Figure 7:
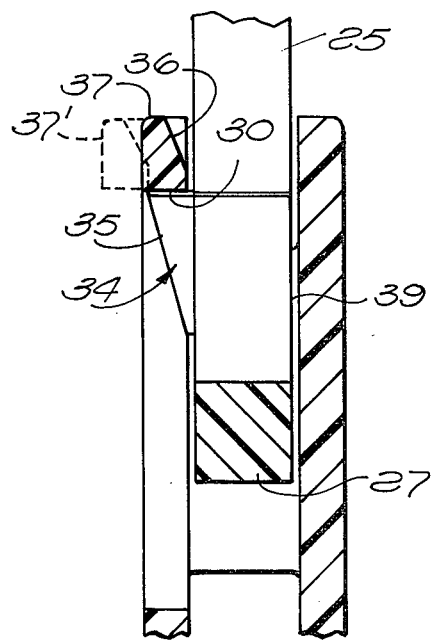
FIG. 7 is an enlarged section on line 7—7 of FIG. 3.
Figure 5:
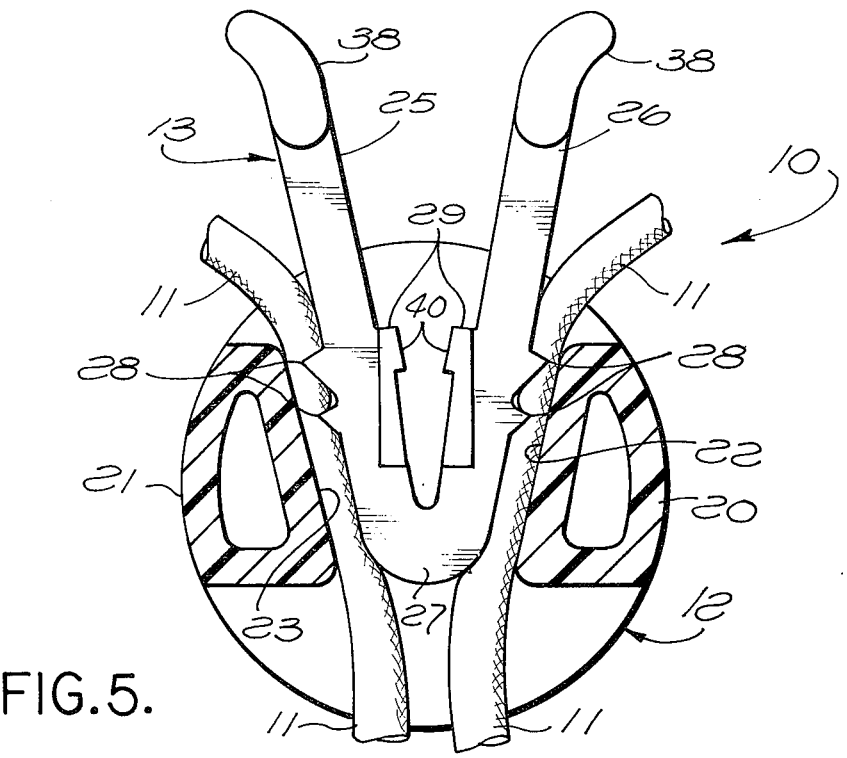
FIG. 5 is a view similar to FIG. 4, but showing the slide element when a substantial pulling force is being exerted on the cords, and the wedging action has tightened the grip on the cords.

Upward retracting movement of slide 13 relative to body 12 is limited at the FIG. 4 position by engagement of two shoulders 29 on arms 25 and 26 with a transverse shoulder 30 formed on rear wall 15 of body 12. More particularly, as seen best in FIG. 3, the rear wall 15 desirably contains an elongated slot 31, defined by two parallel opposite side edges 32, an inner end edge 33, and an outer end edge forming and serving as the discussed shoulder 30 against which slide shoulders 29 are engageable. Shoulders 29 on the slide may be formed at the ends of two elongaged projections 34 carried by the two arms 25 and 26. At their axially outer ends (upper ends in FIG. 4 etc.), projections 34 form the abrupt stop shoulders 29, which desirably extend perpendicular with respect to the planes of body surfaces 17 and 18, and essentially prependicular to axis 24. Extending from these stop shoulder surfaces 29, the projections 34 have gradually inclined camming surfaces 35 (FIG. 7), which are engageable with an inclined camming surface 36 formed at the inner side of portion 37 of body wall 15 to locally spread portion 37 away from wall 14 to the broken line position of FIG. 7 during initial insertion of the slide into the body.

The two arms 25 and 26 project upwardly or axially outwardly beyond body 12 to form a pair of divergent laterally spaced handles 38 by which the slide is manipulated. The resilience of the material of slide 13, including its return bend portion 27, is such as to normally urge arms 25 and 26 laterally apart and to the cord gripping positions of FIG. 4, in which the teeth 28 are close enough to side wall surfaces 22 and 23 to lock cords 11 against downward longitudinal movement. Further, even in the FIG. 4 gripping condition of the device, the resilience of the slide is preferably such as to tend to urge the arms still farther apart, beyond the positions at which the cords limit such movement. Also, as shown by the gaps G in FIG. 3, the projections 34 do not in the FIG. 4 condition engage the side walls of slot 31 or prevent such further spreading of the arms.

In describing the use of the locking device 10, assume first of all that the body and slide have not as yet been assembled together, but that the two cords 11 have been passed through passage 19. The device is assembled by grasping slide 13 by its handle portions 38, and pushing the return bend inner portion 27 of the slide downwardly into body passage 19 between the two cords. As projections 34 on arms 25 and 26 engage the transverse portion 37 of the body at the outer end of slot 31, camming surfaces 35 on projections 34 engage cam surface 36 at the inner side of body portion 37 as previously discussed, while the planar undersurfaces 39 of the arms engage and slide along the wall surface 17 at the inner side of the body wall 14, to cam or spread portion 37 away from the opposed portion of wall 14, as to the broken line position represented at 37' in FIG. 7, so that projections 34 can move inwardly past portion 37 and to the FIG. 7 position, at which time the resilience of portion 37 and the ramainder of body 12 causes portion 37 to again move to its initial position of closer spacing with respect to wall 14, so that shoulder 30 thereafter prevents movement of projections 34 beyond the FIG. 4 position, and thus limits upward retracting movement of the slide relative to the body.

After the device has been assembled in this manner, the resilience of the material of slide 13 normally retains arms 25 and 26 of the slide in the spread condition of FIG. 4, to at all times exert an effective locking action against the cords, retaining them against downward movement relative to the body. This spring type locking action positively prevents longitudinal movement of the cords under light load conditions, or under vibrational conditions or when intermittent forces are exerted against the cords, and does so without the necessity for any axial setting movement of the slide relative to the body to initiate the locking action. If greater load forces are applied to the cords, tending to pull them downwardly in FIGS. 1, 2, 3, 4, etc., the cords will act through their engagement with teeth 28 to pull the slide downwardly relative to the tapering throat formed by surfaces 22 and 23, as to the condition illustrated in full lines in FIG. 4. The resultant wedging action caused by the convergence of surfaces 22 and 23 actuates arms 25 and 26 toward one another against the resilience of, and yielding force exerted by, the material from which the slide is formed, to thereby increase the holding effectiveness of the device. This wedging action may be enhanced as much as necessary by further downward movement of the slide, ultimately if necessary to a position in which the inner opposed planar surfaces 40 of arms 25 and 26 may abut directly against one another and limit further closing movement of the arms, and thereafter enable the arms to serve together as a single essentially rigid and non-compressible slide. When the excessively high load forces are released, the slide will normally tend to return upwardly to its FIG. 4 position relative to the body.

Figure 6:
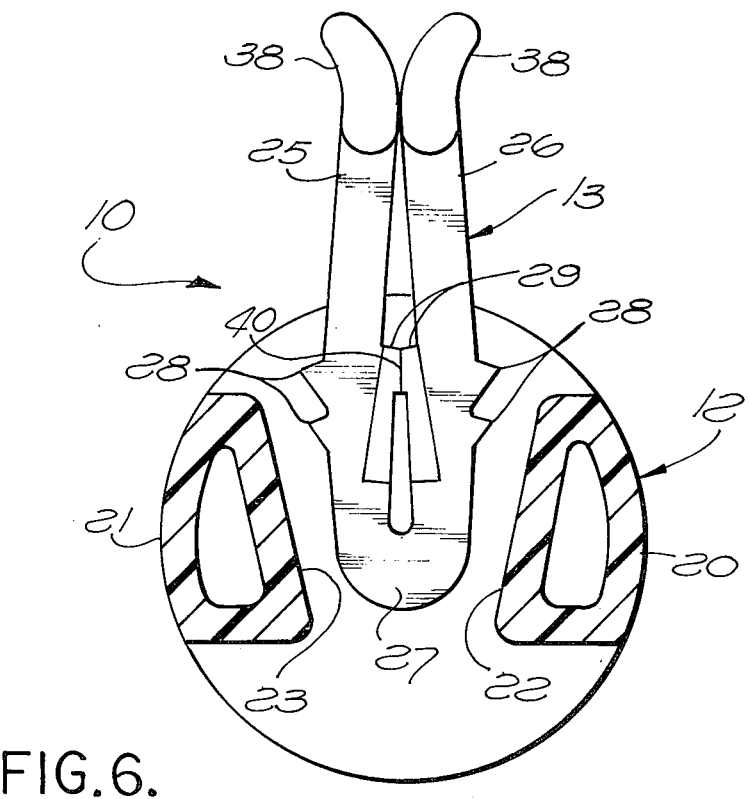
FIG. 6 is a view similar to FIG. 4, but showing the two arms of the slide as they appear when squeezed together to release the cords for longitudinal movement.

When it is desired to release even the light load spring induced lock on the cord, this result may be attained by manually squeezing together the two arms 25 and 26, between the thumb and forefinger of a user, and to the released condition illustrated in FIG. 6, in which teeth 28 are far enough from surfaces 22 and 23 to allow the cords to be moved relatively freely in either longitudinal direction. When the cords have been moved longitudinally to a desired position, the handles 38 are released, and arms 25 and 26 then return resiliently to their FIG. 4 condition in which they again exert an instant automatic locking action against the cords.

Though a typical embodiment of the invention has been described in detail, it will of course be understood that the invention is not to be considered as limited to this particular form, but includes in addition all variations falling within the scope of the appended claims.

I claim:

1. A locking device comprising:
   a body containing a passage having two opposite side walls;
   a slide contained at least partially within said passage and movable essentially along a predetermined axis relative to said body;
   said slide having two arms with gripping portions located opposite said two side walls respectively in a relation defining two paths at opposite sides of said slide along which two elongated flexible elements can extend between said arms and side walls;
   said side walls having portions which converge toward one another as they advance in essentially a predetermined axial direction and which are positioned laterally opposite said gripping portions of said arms at locations to clamp said elements tightly between said gripping portions and said opposed converging portions of said side walls and thereby positively lock said elements against movement in said predetermined direction, by a wedging action resulting from the convergence of said wall portions;
   said arms being yieldingly urged relative to one another in opposite lateral directions and toward said two converging portions of said side walls respectively to clamp said elements thereagainst independently of said wedging action, and being actuable inwardly away from said side walls to release said elements.

2. A locking device as recited in claim 1, in which said two arms are adapted to be actuated toward one another by said wedging action as said elements are pulled in said predetermined direction with increasing force.

3. A locking device as recited in claim 1, in which said two arms, upon movement toward one another, are engageable laterally against one another in a relation limiting such movement at a predetermined extreme position.

4. A locking device as recited in claim 1, in which said gripping portions of said arms have teeth at their outer sides facing toward said converging portions of said side walls of the passage for engaging and gripping said elongated elements.

5. A locking device as recited in claim 1, in which said two arms of said slide are connected together resiliently to yieldingly urge said arms in said opposite lateral directions and toward said side walls respectively.

6. A locking device as recited in claim 1, in which said slide has a portion connecting corresponding ends of said arms together resiliently in a manner yieldingly urging said arms in said opposite lateral directions.

7. A locking device as recited in claim 1, in which said slide is formed of a single piece of elastic material having a portion integrally joining said two arms together at ends thereof, and having resilience yieldingly urging said arms in said opposite lateral directions.

8. A locking device as recited in claim 7, in which said arms have handle portions projecting outwardly beyond said body and accessible to a user, and adapted to be manually squeezed toward one another to release said elongated elements.

9. A locking device as recited in claim 8, in which said gripping portions of said arms have teeth at outer sides thereof facing toward said converging portions of said side walls respectively for gripping said elongated elements.

10. A locking device as recited in claim 9, including a projection on at least one of said arms received within a slot in said body and engageable with an end of the slot in a relation limiting axial retracting movement of said slide.

11. A locking device as recited in claim 1, including projections on said arms received within a slot in said body and engageable with an end of the slot in a relation limiting axial retracting movement of said slide.

12. A locking device as recited in claim 1, including projections on said arms received within a slot in said body and engageable with an end of the slot in a relation limiting axial retracting movement of said slide, said projections having camming surfaces at axially leading sides thereof adapted to engage and slightly resiliently distort a wall of said body upon initial insertion of the slide into the body passage to allow movement of said projections into said slot.

13. A locking device as recited in claim 1, in which said arms have handle portions projecting to a position at which they are accessible to be manually squeezed toward one another to release said elongated elements.

14. A locking device comprising:
    a body containing a passage which tapers to a reduced dimension as it advances in essentially a predetermined axial direction;
    a slide contained at least partially within said passage and movable generally axially relative to said body;
    said slide having a locking portion located laterally opposite a side wall of said tapering passage in a relation defining a path along which an elongated flexible element can extend between said locking portion and said side wall;
    said side wall having a portion which converges toward an opposite side of said passage as it advances in essentially said predetermined axial direction and which is positioned laterally opposite said locking portion of said slide at a location to clamp said element tightly between said locking portion and said opposed converging portion of said side wall and thereby positively lock said element against movement in said predetermined axial direction, by a wedging action resulting from the convergence of said side wall portion toward said opposite side of the passage;
    said locking portion of the slide being yieldingly urged laterally toward said portion of said side wall which converges toward said opposite side of the passage to clamp said elongated element thereagainst independently of said wedging action.

15. A locking device as recited in claim 14, in which said slide has a second portion yieldingly urged laterally away from said locking portion to exert force against said opposite side of said passage in a relation urging said locking portion toward said side wall.

16. A locking device as recited in claim 14, in which said locking portion of the slide has teeth facing toward said converging portion of said side wall of said passage to grip said element.

17. A locking device as recited in claim 14, in which said slide has a portion projecting outwardly relative to said body to a position of access for manual actuation of said slide.

18. A locking device as recited in claim 14, including shoulders on said slide and body limiting axial movement of the slide relative to the body.

19. A locking device as recited in claim 14, in which said slide has a portion spaced laterally from said locking portion and engageable with an opposite side of said passage and connected to said locking portion at corresponding ends of said portions, said slide being formed at least partially of resilient material constructed and positioned to yieldingly urge said two portions of the slide relatively laterally apart to yieldingly urge said locking portion against said elongated element.

20. A locking device as recited in claim 1, in which said slide is formed of a single essentially U-shaped piece of elastic material having a portion integrally joining said two arms together at first ends thereof and having resilience yieldingly urging said arms relatively apart and in said opposite lateral directions, said arms having second ends which project generally axially from an end of said passage and beyond said body and between said elongated elements and which have handle portions at said second ends adapted to be manually squeezed toward one another to release said elongated elements, said gripping portions of said arms including teeth formed at the outer sides of said arms at locations intermediate said first and second ends thereof and facing outwardly toward said converging portions of said side walls.

* * * * *